UNITED STATES PATENT OFFICE.

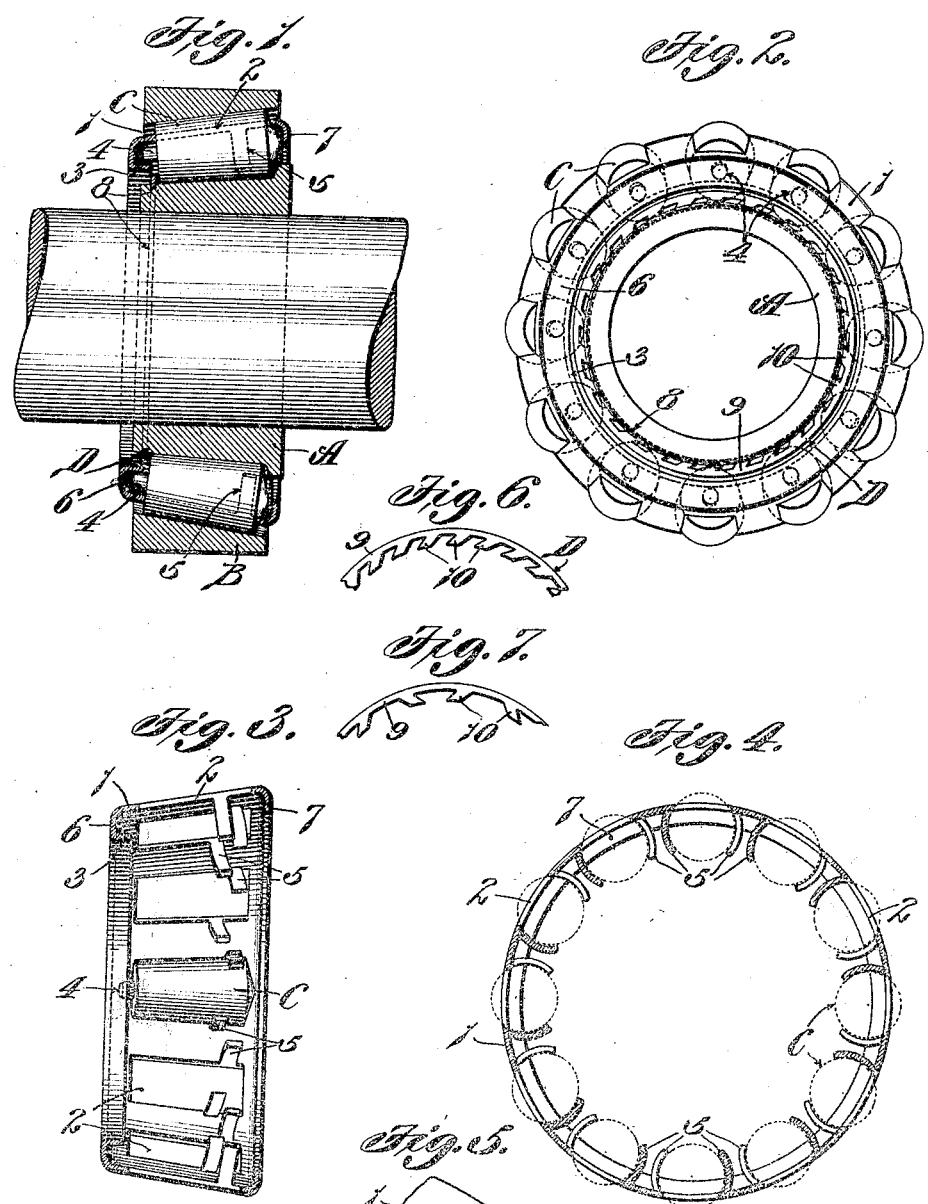

CHESTER A. HEINZELMAN, OF BELLEVILLE, ILLINOIS.

ROLLER-BEARING.

1,125,527.   Specification of Letters Patent.   Patented Jan. 19, 1915.

Application filed June 1, 1914. Serial No. 842,246.

*To all whom it may concern:*

Be it known that I, CHESTER A. HEINZELMAN, a citizen of the United States, residing at the city of Belleville, county of St. Clair, and State of Illinois, have invented a certain new and useful Improvement in Roller-Bearings, of which the following is a full, clear, and exact description, such as will enable others skilled in the art to which it appertains to make and use the same.

This invention relates to roller bearings, and has for its main object to provide an inexpensive and serviceable bearing in which the cage can be stamped from sheet metal, and which is so constructed that the rollers will not drop out of same when the cage is removed from the cone or inner member of the bearing.

Another object is to provide a roller bearing in which novel means are employed to retain the cage in position in the bearing.

Other objects and desirable features will be hereinafter pointed out.

Figure 1 of the drawings is a vertical sectional view of a roller bearing constructed in accordance with my invention. Fig. 2 is an end view of the cage and the inner bearing member. Fig. 3 is a vertical longitudinal sectional view of the cage showing one of the rollers arranged in operative position. Fig. 4 is a vertical transverse sectional view of the cage. Fig. 5 is a perspective view of a portion of the cage; and Figs. 6 and 7 are fragmentary views showing two different forms of cage-retaining rings.

Referring to the drawings which illustrate the preferred form of my invention, A and B, respectively, designate the inner and outer members of a roller bearing which form a race-way for the rollers C that are arranged between same, as shown in Fig. 1, the inner member of the bearing herein shown being substantially cone-shaped and the outer member consisting of a cup or ring whose inner surface is tapered slightly. The rollers C are held in a certain position with relation to each other by means of a cage which consists of a tapered cylindrical-shaped member 1, preferably stamped from sheet metal, and provided with openings 2 for receiving the rollers C. Outward movement of the rollers with relation to the cage 1 is prevented by the side edges of the openings 2 in said cage that receive said rollers, which side edges are beveled or curved slightly, as shown in Fig. 4, so as to conform approximately to the shape of the rollers. Inward movement of the rollers is prevented by means of an annular flange 3 at one end of the cage, which coöperates with projections 4 on the rollers, and fingers 5 that project inwardly from the inner side of the cage and partially surround the rollers C, as shown clearly in Figs. 3 and 4. The annular flange 3 is formed integral with a ring-shaped flange 6 arranged at one end of the cage 1, and the fingers 5 are arranged in pairs and are long enough so that they will extend past the centers of the rollers. In the embodiment of my invention herein shown the fingers 5 are integral with the body portion 1 of the cage and are formed by leaving uncut strips of metal in the openings 2 when said openings are formed, as shown clearly in Fig. 5, these strips being thereafter bent inwardly so as to conform approximately to the shape of the rollers C, as shown in Fig. 4. A pair of fingers 5 is preferably provided for each of the rollers C, said fingers being adapted to lie on opposite sides of the rollers C so as to partially embrace the same. As shown in Figs. 3 and 5, the two fingers 5 that comprise each pair are staggered or offset with relation to each other in order that they may be made of sufficient length, from the available metal between the sides of the openings 2, to extend far enough beyond the center of the rollers C to prevent inward movement thereof.

By forming the strips or fingers in the manner just above described I am enabled to provide a roller-retaining means in the cage that is very efficient and simple, and which can be formed at the same time the cage is being formed at a very slight additional cost. The spring fingers 5 and the flange 3 absolutely prevent the rollers C from dropping out of the openings 2 when the cage is being placed in or removed from operative position in the bearing, and said fingers can be shifted or sprung slightly to permit of the removal of a damaged roller and the insertion of a new one. The front end face 6 and the flange 3, besides forming a retaining means for the projections 4 on the front ends of the rollers, act as a reinforcement at this end of the cage, and the rear end of the cage is strengthened and reinforced by means of an annular flange 7 that is bent inwardly from the body portion 1 of the cage.

From the foregoing it will be seen that I have provided a cage for roller bearings that can be made from sheet metal that is reinforced at its ends in a novel manner, so as to obtain the desired strength, and which is provided with novel means for retaining the rollers in operative position.

With a cage of the construction heretofore described wherein the rollers are assembled in the cage before it is placed in position in the bearing, it is necessary to provide a detachable abutment or retaining ring on one end of the inner bearing or cone A that can be arranged in position after the cage has been placed on the cone A. As shown in Fig. 1, the cone or bearing A is provided with an annular groove 8 adjacent the small end thereof, and after the cage has been placed in position, a ring D is forced or sprung into said groove so that it forms an annular abutment that prevents the cage and rollers from being detached from the bearing. In the embodiment of my invention herein shown the ring D comprises a solid peripheral portion 9 and a plurality of inwardly extending angularly disposed spring fingers 10 that will yield or be forced outwardly toward the periphery of the ring when said ring is being forced over the small end of the cone A, and which will spring inwardly as soon as the groove 8 is reached, and thus securely hold the ring in operative position in said groove, as shown in Fig. 1.

A roller bearing of the construction above described is very light, simple in construction, highly efficient and can be produced at a low cost of manufacture.

Having thus described my invention, what I claim is:

1. In a roller bearing, a cylindrical sheet metal cage provided with a plurality of roller-receiving openings, rollers arranged in said openings, said rollers being of greater diameter than the width of said openings, and fingers curved inwardly from the side edges of said openings and extending around opposite sides of said rollers to a point beyond the center thereof, the fingers on one side of said rollers being staggered with relation to the fingers on the opposite side.

2. In a roller bearing, a cage, rollers permanently arranged in said cage, a cone on which said rollers bear, said cone being provided with a groove adjacent one end thereof, and a ring provided with a plurality of inwardly disposed spring fingers that are adapted to lie in said groove.

3. In a roller bearing, a cylindrical sheet metal cage provided with roller-receiving openings, rollers arranged in said openings, means for retaining said rollers in position in said openings, a cone against which said rollers bear, and means on said cone that prevents longitudinal movement of said rollers and cage in one direction, said means comprising a vertically disposed flat ring provided with a plurality of spring fingers that coöperate with an annular groove formed in said cone adjacent one end thereof.

4. In a roller bearing, a cylindrical tapered sheet metal cage provided with a plurality of rollers permanently arranged therein, a cone on which said rollers bear, and means for preventing longitudinal movement of said rollers with respect to said cone, said means comprising a flat ring having a solid peripheral portion, and a plurality of angularly disposed fingers lying in the same vertical plane and extending inwardly from said solid portion and which coöperate with an annular groove arranged adjacent one end of said cone.

5. In a roller bearing, a tapered cylindrical sheet metal cage provided with a plurality of roller-receiving openings, rollers arranged in said openings, projections on one end of said rollers that coöperate with an annular pocket formed in said cage, a plurality of fingers integral with said cage that partially embrace said rollers, a cone on which said rollers bear, and means for preventing said rollers from moving longitudinally of said cone, said means comprising a ring provided with a mutilated portion that is adapted to be snapped into a groove formed in said cone adjacent one end thereof.

In testimony whereof I hereunto affix my signature in the presence of two witnesses, this 26th day of May 1914.

CHESTER A. HEINZELMAN.

Witnesses:
ALWIN BOERWER,
ARTHUR KASTEL.